US011055493B2

(12) United States Patent
Lewis (10) Patent No.: US 11,055,493 B2
(45) Date of Patent: Jul. 6, 2021

(54) CONVERSATION SYSTEM

(71) Applicant: James Lewis, North Vancouver (CA)

(72) Inventor: James Lewis, North Vancouver (CA)

(*) Notice: Subject to any disclaimer, the term of this patent is extended or adjusted under 35 U.S.C. 154(b) by 151 days.

(21) Appl. No.: 16/394,172

(22) Filed: Apr. 25, 2019

(65) Prior Publication Data

US 2019/0332669 A1 Oct. 31, 2019

Related U.S. Application Data (60) Provisional application No. 62/662,659, filed on Apr. 25, 2018.

(51) Int. Cl.
*G06F 40/30* (2020.01)
*G06F 16/332* (2019.01)
*G06F 16/33* (2019.01)

(52) U.S. Cl.
CPC .......... *G06F 40/30* (2020.01); *G06F 16/3329* (2019.01); *G06F 16/3344* (2019.01)

(58) Field of Classification Search
CPC .............................. G06F 40/30; G06F 16/3329
USPC .......................................................... 704/9
See application file for complete search history.

(56) References Cited

U.S. PATENT DOCUMENTS

| 2005/0105712 A1* | 5/2005 | Williams | H04M 3/5166 |
| | | | 379/265.02 |
| 2018/0068016 A1* | 3/2018 | Roy | G06F 16/34 |
| 2018/0285449 A1* | 10/2018 | Baughman | G06F 16/334 |

OTHER PUBLICATIONS

Y. H. P. P. Priyadarshana, K. I. H. Gunathunga, K. K. A. N. N. Perera, L. Ranathunga, P. M., "Sentiment analysis: Measuring sentiment strength of call centre conversations," 2015 IEEE International Conference on Electrical, Computerand Communication Technologies (ICECCT), Coimbatore, 2015, pp. 1-9, (Year: 2015).*

* cited by examiner

*Primary Examiner* — Bharatkumar S Shah
(74) *Attorney, Agent, or Firm* — McMillan LLP (57) ABSTRACT

A conversation system allowing for complex, open-ended conversations with users and method of its operation are disclosed. An example method includes identifying a conversation and a user, encoding the user's input message and finding codes in other texts, generating responses, and selecting an appropriate response, and sending the selected response to the user. The conversation system utilizes various methods, scoring, codes, and the like to find the appropriate responses. Example methods also include steps for sending short sentences representing action, or sending a "thought" or "daydream" to the user that reveals the emotional state of the conversation system with respect to the user, and steps for changing that emotional state. The system avoids reliance on artificial neural networks and keeps track of the context of a conversation by saving conversation codes in a database.

15 Claims, 7 Drawing Sheets

CONVERSATION SYSTEM

TECHNICAL FIELD

The present disclosure relates generally to dialog systems, and more specifically to dialog systems with the ability to engage in conversation with a user.

BACKGROUND

Today, people interact with their mobile devices (e.g., smartphones, tablets, and laptops) or with their desktop device (e.g., desktop computer) by talking to or typing text into the device, or to complete various tasks such as, for example, searching the internet, making appointments, starting programs, finding contact information, finding items to purchase, or controlling appliances in their homes. Such interactions may be made without physically navigating through menus or clicking a mouse, or, in the case of voice enabled applications or smart speakers, without even touching the mobile device or desktop device.

Such interactions are made possible with dialogue systems which are often referred to as "virtual assistants", "virtual personal assistants", "intelligent personal assistants", "chatbots", or "artificial intelligence". There are many types of dialogue systems such as, but not limited to, pattern matching systems, systems using algorithms or artificial neural networks, and systems using natural language processing.

Although dialogue systems provide users with a convenient option for interacting with a device, especially a mobile device, website, kiosk or smart speaker, these dialogue systems have limitations. For example, although people have many ways of expressing the same thought, a pattern matching system can only handle user input that exactly matches a set of predetermined patterns in the pattern matching system.

Algorithms can assist with this limitation by scoring user input and matching it with a class of responses; but there is no guarantee of a perfect match, and as such the responses may not make sense to the user. Artificial neural networks can be trained to match a variety of user inputs to user intents. However, neural networks have several disadvantages. Neural networks require a lot of data that may not be available to a person or organization wishing to deploy a dialogue system. Training neural networks requires prohibitive amounts of computer resources. Further, training by users can cause loss of customers for organizations and businesses as users want to be understood and want their interactions to go as smoothly as possible. Moreover, while all these systems may be able to respond to the last user input, they have limitations in understanding the context of a conversation. These limitations limit opportunities for the deployment of dialogue systems.

All these dialogue systems face limitations when carrying on a conversation that goes beyond simple tasks such as setting a reminder or executing a simple query, and conventional dialogue systems generally function within limited domains that are too small to allow for an open-ended conversation. For example, in conversation, these dialogue systems often repeat themselves, stop making sense, fall back to a default or generic response, attempt to keep a conversation on a scripted track, or pass the conversation off to a human. Conventional dialogue systems thus can limit the opportunities for interaction and building relationships with users. They can also frustrate users wishing to engage in conversation with a dialogue system and make users less likely to engage with these systems and experience the benefits they provide.

In an increasingly digital environment, electronic commerce system developers are constantly evaluating ways to improve the consumer experience and the transfer of goods and services across such electronic commerce systems. Examples of areas of improvement include greater customer convenience, increased trust between buyer and seller, and increased user-friendliness of electronic commerce systems. It is an object of the present invention to provide a dialogue system that mitigates are least some of the disadvantages identified above. It is also an object of the invention to provide a dialogue system that can engage with users in conversation and share information in a way that helps users find answers or solutions that would be harder to find on their own.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of the invention, there is provided a method for conducting an automated conversation. The method includes receiving, by a processing unit, a user input from a user device; generating current codes from the user input; generating phrases from the current codes; generating a first set of responses associated with each of the phrases; assigning a score to each of the first set of responses; selecting a top response having the highest score among the first set of responses; adding the selected response to a list of responses; determining the highest scoring response in the list; and sending the top scoring response from the list to the user device According to another aspect of the invention, there is provided a method for conducting an automated conversation, the method comprising: receiving, by a processing unit, a user input from a user device; generating current codes from the user input; saving the current codes associated with the automated conversation in a database; generating a first set of responses associated with each of the current codes; assigning a score to each of the first set of responses associated with the current codes; selecting a first top response having the top score among the first set of responses; and upon the top score exceeding the threshold score, sending the selected first top response to the user device.

According to another aspect of the invention, there is provided a conversation system for conducting an automated conversation with a user device. The system includes a data center that has a processing unit interconnected to memory, storage, and a network interface for communicating with the user device, the processing unit coupled to the memory and the storage storing processor executable instructions; and a server comprising software for an instant messaging module. The data center implements an elasticsearch service, a plurality of indices, and a database. The processing unit executes the instructions to perform the steps of: receiving a user input from the user device; generating current codes from the user input; generating phrases from the current codes; generating a first set of responses associated with each of the phrases; assigning a score to each of the first set of responses; selecting a top response having the highest score among the first set of responses; adding the selected response to a list of responses; determining the highest scoring response in the list; and sending the top scoring response from the list to the user device.

According to another aspect of the invention, there is provided a non-transitory computer-readable medium having instructions stored thereon. The instructions, when executed by one or more processors, cause the one or more processors to perform the steps of: receiving a user input from the user device; generating current codes from the user input; generating phrases from the current codes; generating a first set of responses associated with each of the phrases; assigning a score to each of the first set of responses; selecting a top response having the highest score among the first set of responses; adding the selected response to a list of responses; determining the highest scoring response in the list; and sending the top scoring response from the list to the user device.

This summary does not necessarily describe the entire scope of all aspects of the disclosure. Other aspects, features and advantages will be apparent to those of ordinary skill in the art upon review of the following description of specific embodiments.

BRIEF DESCRIPTION OF DRAWINGS

In the accompanying figures, which illustrate by way of example only, one or more embodiments of the present invention.

DETAILED DESCRIPTION

Conversation is a way used to understand the world, to be understood by others, to build relationships, and to generate and share new ideas. When taking part in conversation, we do not always know the outcome; the conversation may go in tangents that can be fun, creative, entertaining, and informative in unexpected ways.

The present disclosure relates to a conversation system and methods of operation, which overcome at least some drawbacks of prior art systems. In particular, the conversation system, as shown through embodiments provided herein, provide for open-ended conversations that are not scripted, or predefined in any way or otherwise limited in scope. Such conversations allow users to be understood by a machine through an understanding of their use of language, and allow users to understand and gain knowledge as they do in conversations with other humans. The conversation system, through use of emotional states, connotation, and unexpected associations of ideas, concepts, and content, allows for conversations with a dialogue system that are creative and interesting.

The present disclosure also describes how the conversation system and method of its operation may overcome some drawbacks of prior art systems. For example, unlike a pattern matching type dialogue system, the conversation system does not require user input to exactly match a pattern. Rather, the conversation system finds codes in the user's input and then uses phrases matched with those codes to create more opportunities for generating an appropriate response; that is, not only the user's words but equivalent phrases as well are used to generate a response. The conversation system also uses algorithms and scoring, as well as codes, to find appropriate responses; however, classes of responses are not required. This adds to the flexibility of the system as it allows the conversation to respond to a greater variety of user inputs. For specialized systems where more data is required, an analyst can, with relative ease, import that data into the conversation system's database and indexes. Unlike systems relying on artificial neural networks, no training is required. The conversation system always keeps track of the context of a conversation by saving conversation codes in the system database.

The present disclosure relates further to how the conversation system and method of its operation overcome other drawbacks of prior art systems, making conversations with the system richer and more similar to human-to-human conversation. Prior art dialogue systems have methods for responding to user input. However, when humans participate in conversation with each other, the participants do not simply respond to input; rather their emotions, desires, and motivations at least in part dictate the direction and flow of a conversation. The conversation system represents emotions by saving "emotional states", as represented by codes and matching phrases, in a database. The conversation system's "emotional state" can be revealed to users through "thoughts" and "daydreams" in which the conversation system transmits clues to its state through messages that are not necessarily responses to user input. The conversation system represents "desire" through methods that periodically attempt to change codes in the database representing "emotional state". In addition, no conversation with another person is complete without physical action. The conversation system also has a method for representing "physical action" during a conversation.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

In this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements, method steps may be present, but that these additions do not materially affect the manner in which the recited composition, method, or use functions. The term "consisting of" when used herein in connection with a composition, use, or method, excludes the presence of additional elements and/or method steps.

An "action", as used herein, refers to a short sentence or sentence clause representing an action that is predetermined and saved for further reference. Examples of action are: "Ree gripped him by the arms"; "Ree kept on muttering"; "Ree began to laugh": "Ree shrugged his shoulders".

A "code", as used herein, refers to the function of a word or phrase in a sentence, or phrase, that can be stored for further reference. Words or phrases in sentences, or phrases, have a particular job or function within that sentence, or phrase. That function is described by the code.

A "fix", as used herein, refers to phrases, predetermined and saved for further reference, that a conversation system may use to find thoughtful responses when an issue class has been identified in a user's input. For example, the phrases "be prepared" and "expect unexpected" may be fixes for the issue class "accident".

An "issue class", as used herein, refers to a class of issue, predetermined and saved for further reference, that the conversation system may identify in a user's input. Different words in the user's input may indicate the presence of an issue class. For example, the words "accident", "casualty", "disaster", "mishap" may indicate the issue class "accident".

A "phrase", as used herein, refers to one or more words associated with each code that can be stored for further reference. The phrases are examples of the code found in a sentence, or sentence clause. For example, the phrases "functional", "practical" and "useful" are associated with the Semantic code "useful".

A "response", as used herein, refers to a sentence, sentence clause, or passage of text that has been previously extracted from an electronic version of a fiction or non-fiction book, essay, play, fairy tale, young adult book, short story collection, children's book or a copy of the King James Bible and stored for further reference.

A "score", as used herein, refers to a result of Lucene's Practical Scoring Function, a function used to calculate the relevance of a document, Lucene's Practical Scoring Function is described, for example, in Clinton Gormley, and Zachary Tong, *Elasticsearch: The Definitive Guide: A Distributed Real-Time Search and Analytics Engine*, O'Reilly Media: 2015 pp. 282-315.

A "subscriber", as used herein, may refer to a person or corporation, or any entity that deploys a unique embodiment of the present invention.

A "user", as used herein, refers to any human, software, or other entity that may interact with the conversation system. Exemplary users include individual consumers using a mobile application, or an artificial intelligence "bot" that accesses embodiments of the conversation system for purposes such as indexing information, post-processing of stored data, or any other operation that may be performed by an autonomous electronic entity.

Aspects of the embodiments disclosed herein may be implemented using a variety of technologies. For example, the methods described herein may be implemented in software executing on a computer system, either a stand-alone PC, a server or a cluster of servers connected to a network, or on an on-demand delivery of compute power, database storage, applications, and other information technology (IT) resources through a cloud service platform available via the internet.

As will be described later with reference to FIG. 1, the method described herein may be implemented by a series of computer-executable or processor-executable instructions residing on a storage medium such as a disk drive, memory, or another computer-readable or processor-readable medium. A user may interact with an example conversation system by utilizing a user device selected from a wide range of electronic devices including, for example, a computer (desk top computer, laptop computer, tablet computer), handheld device, smartphone, cellular phone, game console, game pad, remote controller, television device, smart (Internet) television device, audio system, in-vehicle computer system, infotainment system, smart speaker, or any other suitable electronic device.

In general, embodiments depicted herein by way of example will be described in sufficient detail to enable those skilled in the art to practice subject matter of the invention. Many other embodiments may be realized with variations of structural, logical, software, electrical, and other components without departing from the scope as defined by the claims.

Figure 1:
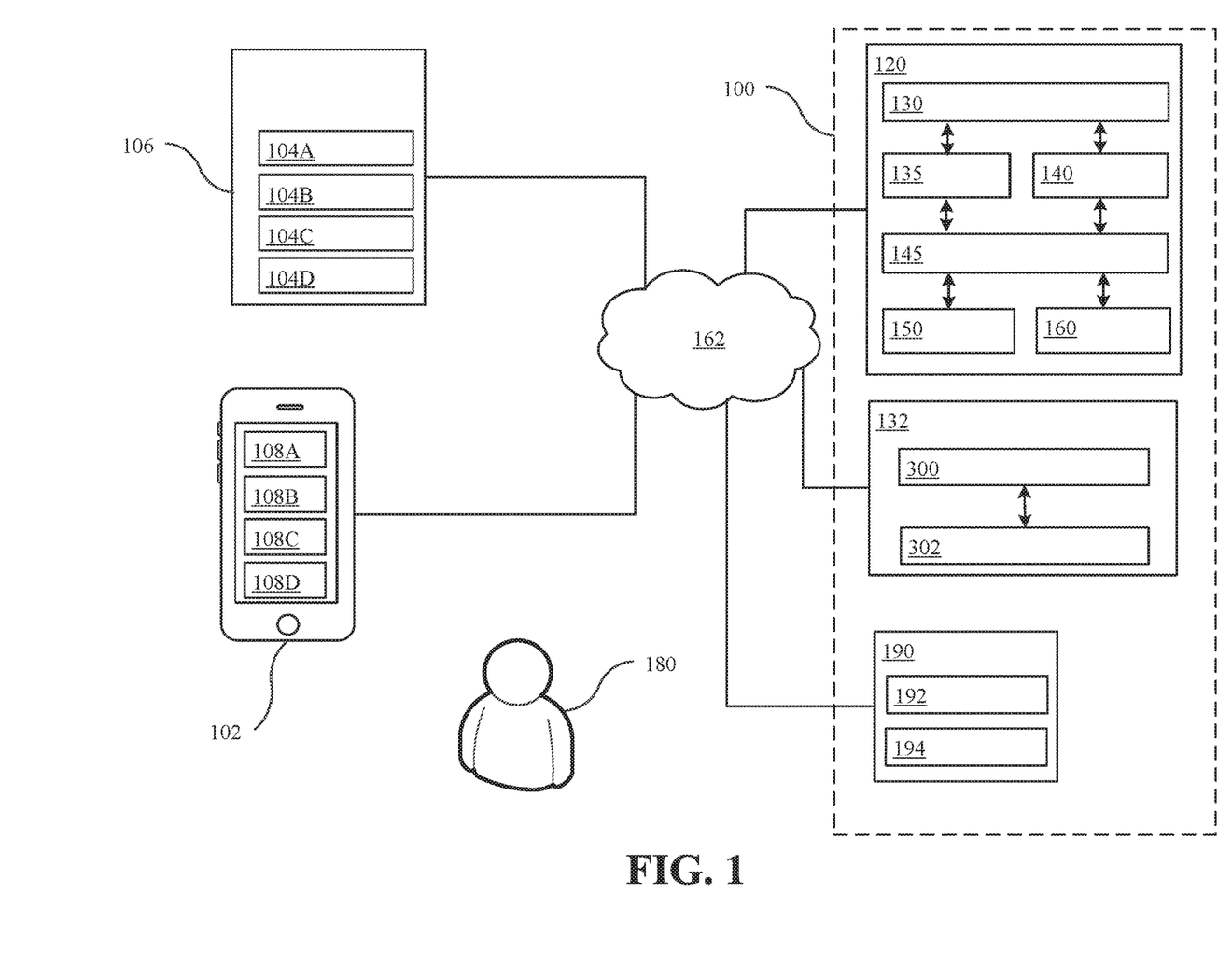
FIG. 1 is a simplified block diagram of a conversation system and a plurality of user devices.

FIG. 1 depicts an embodiment of a conversation system 100 which includes a server 190 and one or more data centers 120, 132 that are interconnected or in data communication with one another via a network 162 such as the internet. One or more user devices 102, 106 can be in data communication with the conversation system 100, through the network 162, and interact with the conversations system 100 to instantiate or carry on interactions.

User device 102 may be a smartphone for use by a user 180, having suitable software installed thereon. Software installed on a user device may include a messaging client, a representational state transfer client, a web browser, a speech-to-text application, the like, or any combination thereof. As depicted in FIG. 1, user device 102 includes a messaging client 108A, a representational state transfer (REST) client 108B, a web browser 108C, and speech-to-text application 108D. For certainty, REST is a stateless architecture style based on the hyper transfer transport protocol (HTTP).

User device 106 may be a personal computer, a tablet or the like. Software installed on device 106 may include a messaging client 104A, a REST client 104B, a web browser 108C, a speech-to-text application 104D and the like.

Server 190 includes instant messaging resources module 192 and user authentication module 194.

Data center 120 is implemented as a cloud computing service such as Microsoft Azure™. Data center 120 includes several hardware and software components. Components of data center 120 include a web role 130, a compute cluster or central processing unit (CPU) 140 for processing instructions, memory 135 that provides temporary storage used by compute cluster or CPU 140 while processing, a storage cluster in the form of storage 160 for storing instructions, and a database 150 which may for example be the Microsoft SQL Server™ database software.

Data center 132 is implemented as a cloud service such as Amazon Web Services™. Data center 132 includes several hardware and software components.

Components of data center 132 include ElasticSearch Service 300, and storage resource 302 which may be implemented as an Amazon S3 Bucket. Elasticsearch is a popular open-source search and analytics engine for use cases such as searching documents, log analytics, real-time application monitoring, and clickstream analytics.

Cloud services are utilized by web role 130, which interacts with the user 180 through messaging resources and user devices 102, 106 as well as web job component 145, which periodically updates database 150 to change the conversation system's "emotional state".

Figure 3:
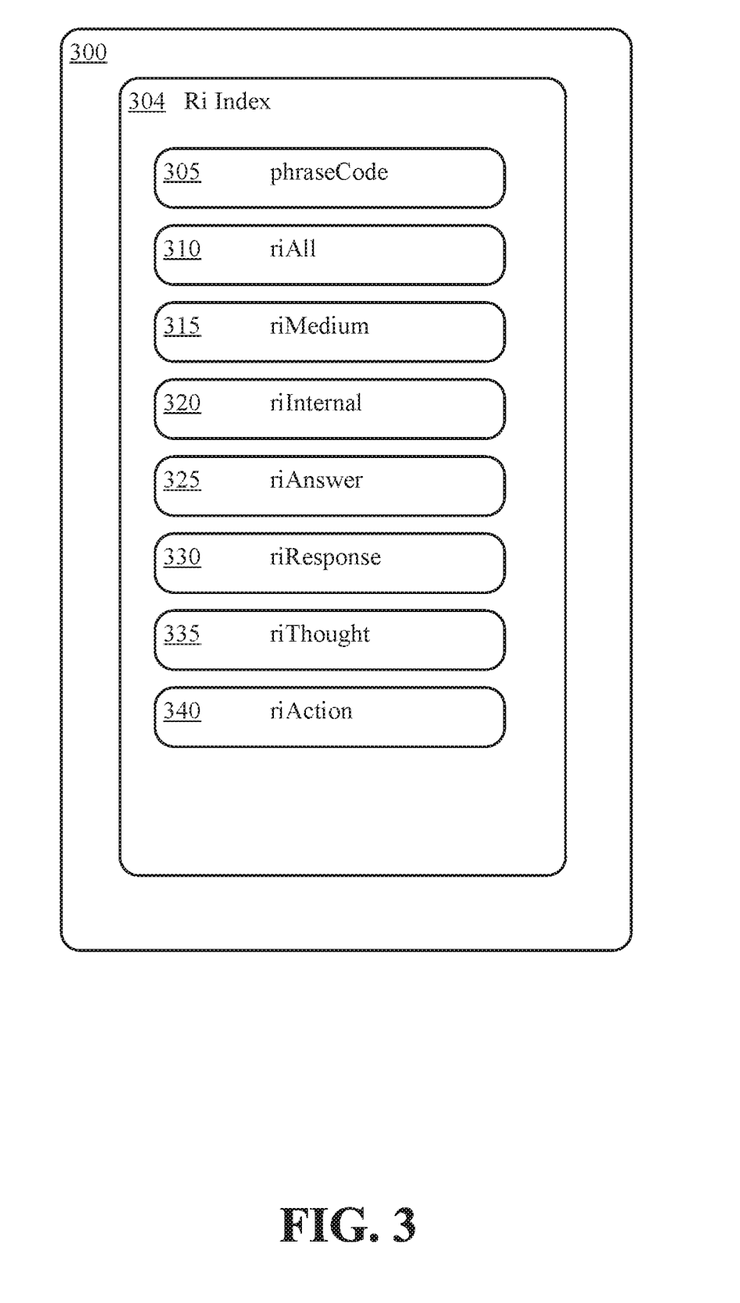
FIG. 3 is a block diagram showing an elastic search service used by the conversation system of FIG. 1.

Conversation system 100 includes indexed and searchable data saved on a computer-readable medium for further reference. In some examples, the Amazon Elasticsearch Service is provided by data center 132. An index can either be stored in memory (having no persistence) or as is more typical, on disk or other persistent storage. In-memory indices provide better performance at the cost of limiting the index size to the amount of available physical memory. In alternate embodiments, an index such as Ri Index 304 may be stored in memory 135. In the present embodiment, Ri Index 304 is stored on-disk in storage resource 302.

Figure 2:
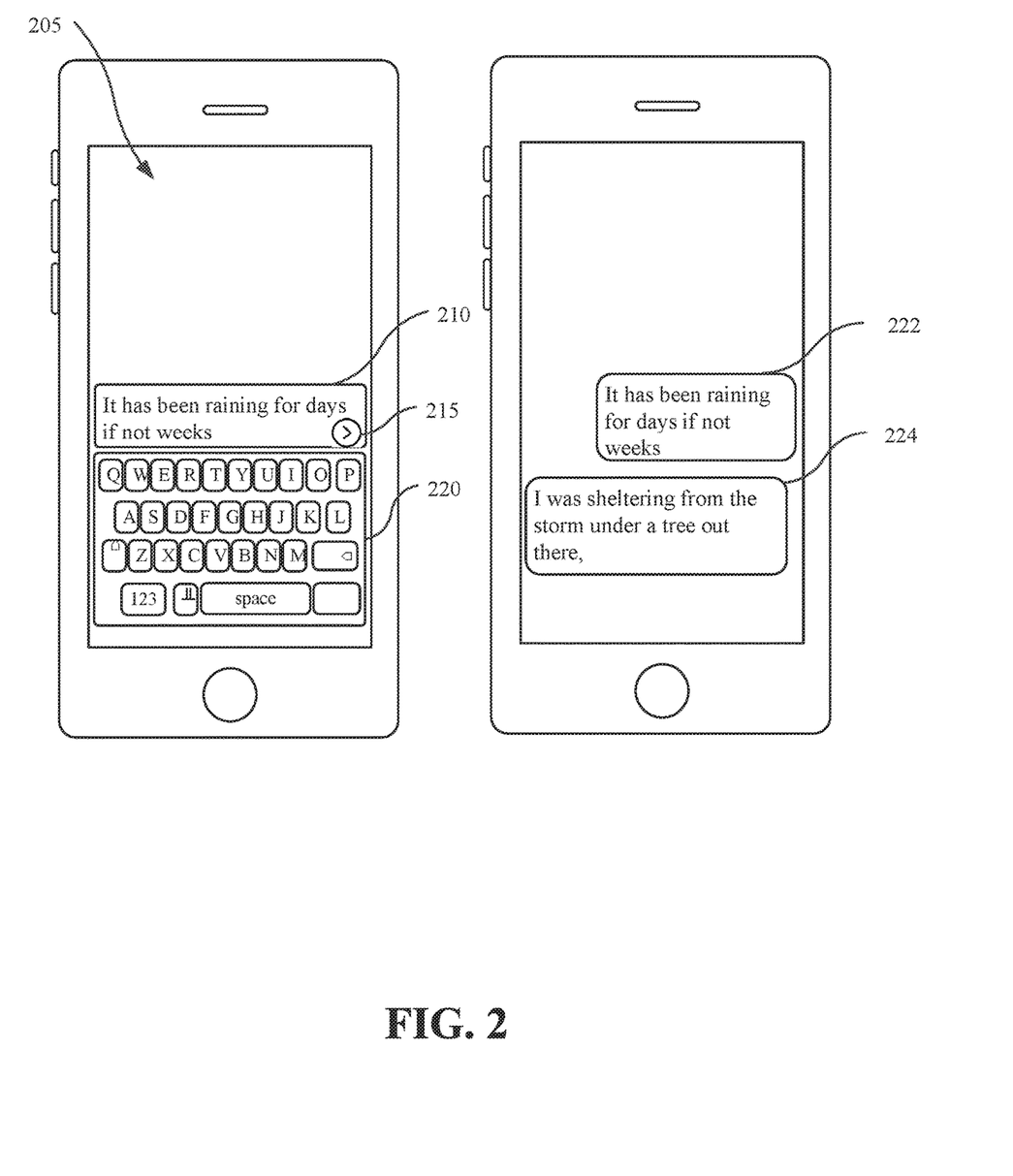
FIG. 2 is a wireframe diagram of the handheld computing device of FIG. 1, while in use.

FIG. 2 depicts a simplified wireframe diagram, or mock-up, of a screenshot of a graphical user interface (GUI) 205 for a user device such as device 102 that can be used with the conversation system 100. The user device 102 in this particular embodiment is a smartphone. The device 102 may have a touchscreen. The screenshot includes an input box 210 into which a user inputs text (e.g. a keyboard 220). A "send message" arrow 215 on GUI 205 is used to send the user message string that has been typed into the input text box 210.

The messaging application on the electronic user device 102 having the depicted GUI 205 can be configured to send messages to and receive messages from one or more recipients. The messaging application displays one or more previous messages 222 and the latest message 224 exchanged between a user of electronic device 102 and a component of the conversation system.

To start a conversation, a user types on keyboard 220 entering the user message string into the text input box 210 and touches or clicks the send message arrow 215. After the user message text string is sent from device 102, it is received and processed by the conversation system 100. In other embodiments, text is populated into the text input box by other means such as, but not limited to, speech-to-text applications.

FIG. 3 is a simplified block diagram of the elasticsearch service 300 implemented using Ri Index 304, an Elasticsearch index containing eight distinct types. An Elasticsearch index is a data organization and store that has a mapping defining multiple types which contain documents corresponding to the type. Each type provides a distinct function, accepting distinct search queries and delivering distinct search results.

The phraseCode type (305) has the following function: searching the type's phrase field with user input delivers a list of codes.

The riAll type (310) has the following function: searching the sceneText field delivers a list of responses and their scores from a set of responses that have a minimum word count of four (4) and a maximum word count of fifty-nine (59). The word count is significant because shorter responses are favored in scoring (this can be managed by processes), and the longer a response the greater chance a response will introduce off-topic ideas into the conversation. Introducing off-topic ideas may be desirable, but restricting the length of a response controls this behaviour.

The riMedium type (315) has the following function: searching the sceneText field delivers a list of responses and their scores from a set of responses that have a minimum word count of seven (7) and a maximum word count of fifty-nine (59).

The riInternal type (320) has the following function: searching the sceneText field delivers a list of responses and their scores from a set of responses that have a minimum word count of four (4) and a maximum word count of six hundred and sixty three (663).

The riAnswer type (325) has the following function: searching the sceneText field delivers a list of responses and their scores from a set of responses that have a minimum word count of 1 and a maximum word count of 663.

The riResponse type (330) has the following function: searching the sceneText field delivers a list of responses and their scores from a set of responses that have a minimum word count of 1 and a maximum word count of 847.

A riThought type 335 comprises words representing issue classes matched with words representing issues and fixes for each class. CPU 140 uses the index to search for issue classes and issue fixes in the following way: A search of issues field may deliver issue classes. If issue classes are delivered, searching the index with those issue class delivers fixes for the issue.

The riAction type (340) has the following function: searching the phraseList field delivers simple sentences or sentence clauses describing action. In an example, the riAction type takes advantage of narrative structure, or the order and manner a narrative is presented to the reader, to represent a conversation system action. A predetermined relationship between codes and phrases and a subsequent action is stored in the riAction type. Phrases are stored in the riAction type's phraseList field and actions are stored in the type's actionText field. Searching the phrases in phraseList field delivers a subsequent action in the action field.

In operation, instant messaging client 108A in user device 102 is used by user 180 to communicate using to instant messaging resources module 192.

Data stored in database 150 or Ri Index 304 may be added, removed or modified to better personalize conversations. Some exemplary embodiments may obtain access to specialized knowledge or skills by interfacing with other services or applications which may be accessed by subscription.

For example, a subscriber may require conversation system 100 to engage in open conversations with users about travel and tourism. To meet that requirement the conversation system 100 may be designed so that travel information such as available tours, tourist attractions, travelogues, vacation packages and destinations are available in a data store such as storage 160, Elasticsearch Service 300, or otherwise provided via external services such as indexes, databases, web services or search engines.

Figure 4:
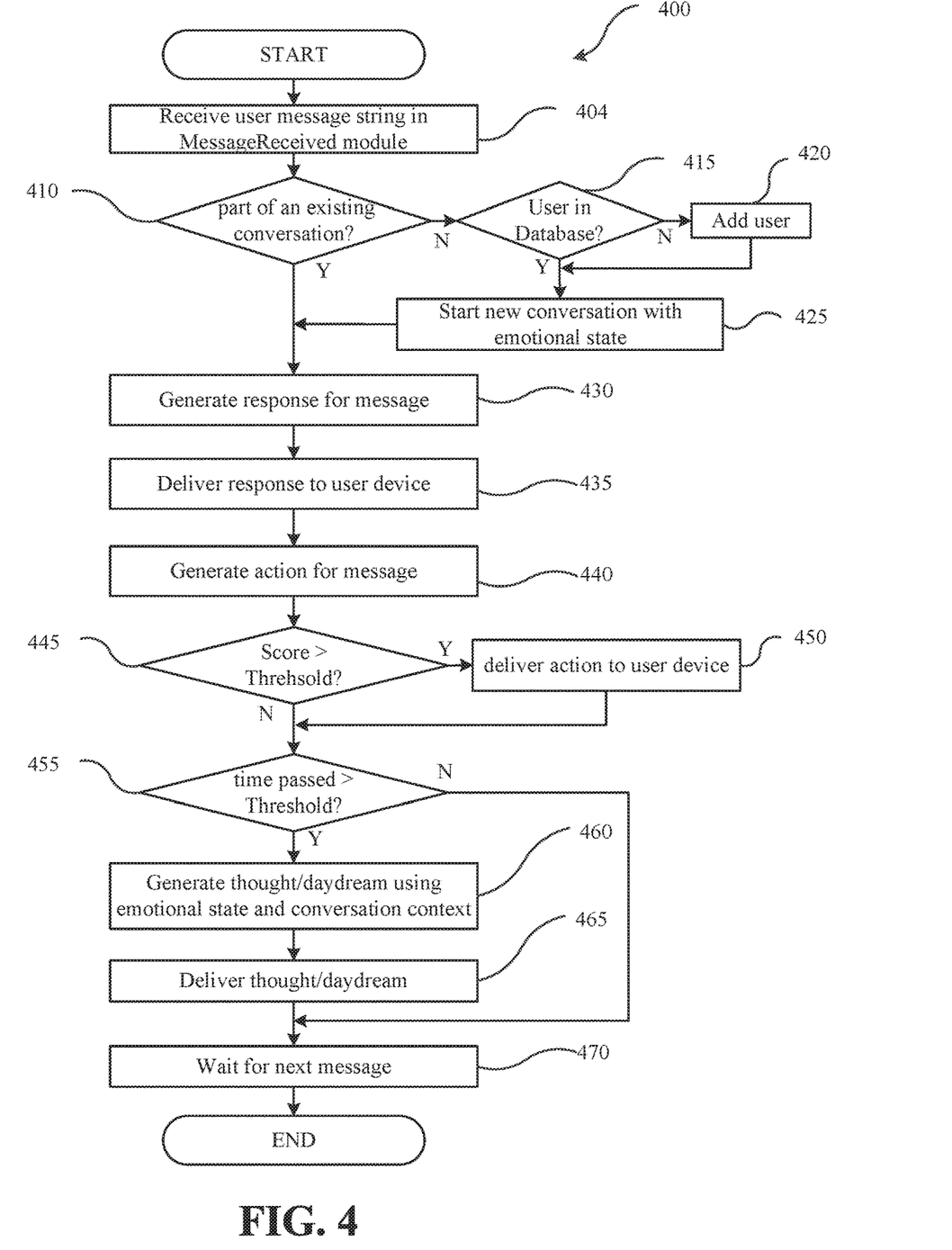
FIG. 4 is a high-level flowchart for a process for receiving user input over a network, and generating and sending a response using the conversation system of FIG. 1.

FIG. 4 illustrates an exemplary process 400 used by conversation system 100 to engage in an open-ended conversation with a user device such as device 102 or user device 106 in use by a current user.

In step 404 the conversation system 100 receives user message string, at data center 120, after the string is routed over the internet from user device 102. When the user message string reaches Windows Azure data center 120, CPU 140 checks for a list of currently active conversations that have been saved with information such as user data or user identifier, in memory 135. If no such active conversation list is saved in memory 135, CPU 140 will create and save a new active conversation list.

In step 410, the CPU 140 attempts to match the current user identifier associated with the received user message string, with one of the user identifiers in the list of conversations saved in memory 135. If CPU 140 doesn't find a match in the conversation list, then CPU 140 sends a structured query to database 150 and attempts to retrieve information about the current user (step 415).

If the database 150 has no information about the user (step 415), then CPU 140 adds the current user into the database (step 420). In step 420, CPU 140 sends a structured query instructing the database 150 to add the current user as a new user. The database 150 creates a unique number, or user key, or primary key, which identifies the newly created user. CPU 140 then sends another query requesting this new user identifier for the current user, that was just created and saved in database 150. CPU 140 then saves that number, or key, identifying the current user, in memory 135 in step 420.

In step 425, CPU 140 starts a conversation with an emotional state. CPU 140 sends a structured query to database 150 requesting the unique key for the last conversation associated with the current user key. If there is no last conversation in the database, CPU 140 sends a structured query to database 150, selecting an emotional code at random, and then saves that emotional code with the unique key for the conversation, or conversation key, in database 150, and saves the new conversation in memory 135.

In step 430, CPU 140 generates a response and in step 435, CPU 140 delivers the response to a user device 102. In step 440, CPU 140 generates an action and if the action scores high enough (step 445), then CPU 140 delivers the action to the user device 102 (step 450). An action may be delivered to the user in addition to a response.

In step 455, CPU 140 determines if enough time has passed for a "thought" or "daydream". If not enough time has passed CPU 140 simply waits for another user input (470). If enough time has passed CPU 140 generates a spontaneous message, a "thought" or "daydream", as shown in step 460 and sends that message over the network to the user device 102, as shown in step 465. After sending a "thought" or "daydream" CPU 140 waits for another user input (step 470).

Recall that "code", as used herein, refers to the function of a word or phrase in a sentence, or phrase, that can be stored for further reference. Words or phrases in sentences, or phrases, have a particular job or function within that sentence, or phrase. That function is described by the code. For example, in the sentence "Jack and Jill walked up the hill.", the word "walk" describes an irreversible action that occurred. "Walk" is an example of an Action ("ACT") type code.

Conversation system 100 has seven (7) types of codes. These codes are: Action ("ACT"), Hermeneutic ("HER"), Semantic ("SEM"), Symbolic ("SYM"), Referential ("REF"), Emotional ("LOV") and ("NLOV").

"Mystery" is an example of an Hermeneutic ("HER") type code, the code of questions or hidden knowledge. "Youth" is an example of the Semantic ("SEM") type code, characteristics of a person or connotations. "Likeness" is an example of the Symbolic ("SYM") type code, antithesis providing meaning. "Business" is an example of the Referential ("REF") type code, referring to common knowledge in a culture. "Absence" is an example of an emotion code, the code of emotional state of a relationship to another person.

An emotion code has two types ("LOV") an emotional state derived from a relationship, and ("NLOV"), the antithesis of that emotional state. All codes are predetermined and saved in database 150 and Ri Index 304 for further reference. Emotion codes are different from other codes, in that, the conversation system 100 does not use emotion codes to generate responses, rather CPU 140 saves an emotion code with a conversation key in database 150 as shown in FIG. 4, thus linking an emotion code, through a conversation, with a user.

The emotion code can influence conversations a user has with a conversation system until it is replaced by another emotion code. An emotion code is also different from other codes in that it has two types, "LOV" and "NLOV". As noted earlier, "LOV" code defines an emotional state of a conversation system, while "NLOV" code represents that emotional state's opposite.

Figure 6:
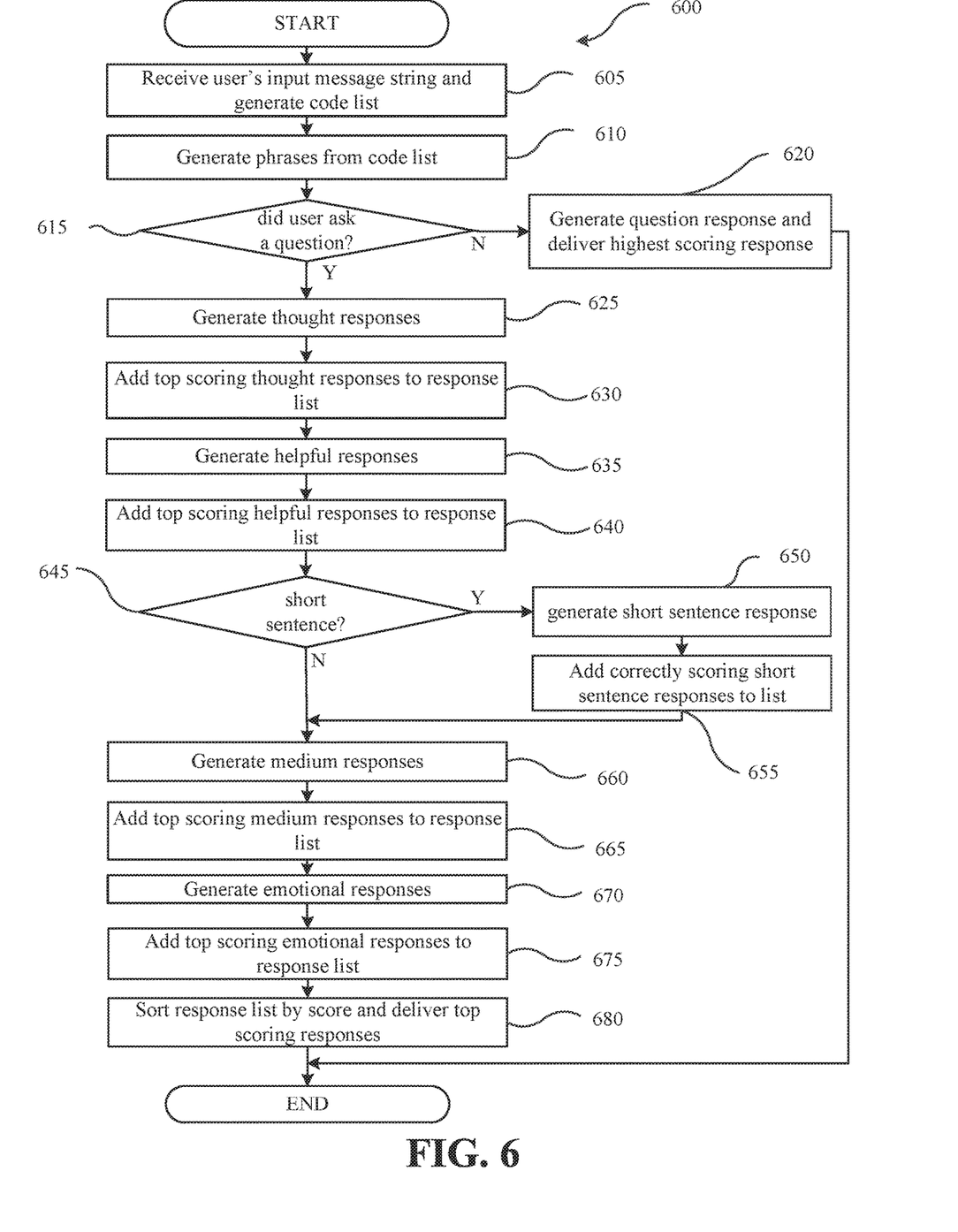
FIG. 6 is a high-level flowchart of a process for generating a high scoring response, using the conversation system of FIG. 1.
Figure 7:
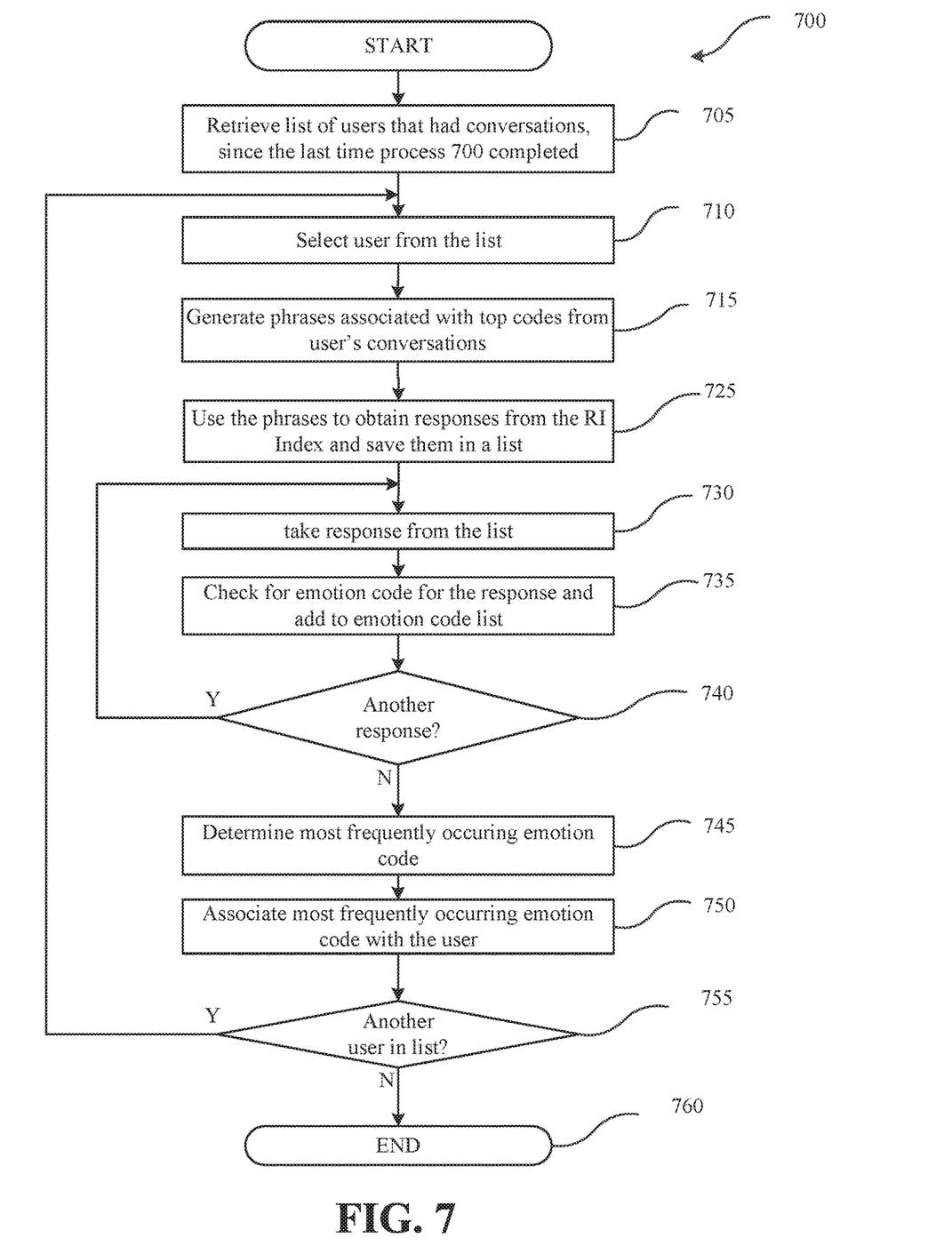
FIG. 7 is a high-level flowchart of a process for changing the emotional state in a conversation system.

As shown in steps 460, 465, 670 and 675 conversation system 100 sends responses to user device 102 based on emotion codes, hinting at or revealing a conversation system emotional state, as saved in database 150. An emotional state can change based on conversations between the user and the conversation system, as shown in FIG. 7. By revealing emotional state, and changes in emotional state, the conversation system delivers more lively, unpredictable and open-ended conversations.

Indexed and searchable data is saved for further reference on data center 132 in an Ri Index 304 in elastic search service 300, In the embodiment depicted in FIG. 1, data center 132 is an Amazon Web Services data center. Another indexed and searchable data is saved for further reference also on data center 132 (or alternately in another data center).

Sending a spontaneous message may be triggered by a timer or another event, for example the completion of another process of the conversation system 100. To generate the "thought" or "daydream" CPU 140 sends the user key, and an emotion code type different from the latest code type used, in a structured query to database 150 and retrieves a list of emotion codes and phrases for the user. The emotion codes retrieved can either be of the type "LOV" signifying the current emotional state of the system, or the "NLOV" type representing the opposite of the current emotional state.

Combining phrases from the emotion codes with phrases from the user's input message string, CPU 140 sends the combination in a request for a list or set of responses from riInternal type 320 contained Ri Index 304. CPU 140 then sends the combination in a request for a list of responses from the riAnswer type 325 Ri Index 304. CPU 140 detects the highest scoring response found from both these searches and sends the response back to the user device 100, as shown in step 465.

Recall that an "action", refers to a short sentence or sentence clause representing an action that is predetermined and saved for further reference. In this embodiment, "action" is saved in Ri Index 304. The following is an example of an "action" generated by process 400. In this example, "Ree" is the name given to the conversation system.

TABLE 1

| Party | Question/Response |
| --- | --- |
| User | This thing is making me so frustrated, I'm ready to throw it all out, throw it out the window. |
| System | Action: Ree nodded and lighted a cigarette |

As may be appreciated, conversation system 100 receives the input message string and generates a code list from the user input. Exemplary codes include: {throw making disappointment shutters everything interfere Self able ready willing out so thing pane}.

Conversation system 100 then generates a phrase list from the code list. The phrase list includes: {so thing window pane out throw making able ready all everything frustrate disappointment shutters agreeable willing interfere meddle me myself Self available eager}.

Conversation system 100 then sends the phrase list in a structured query to riAction type 340 of the Ri Index 304, searching the phraseList field. The system 100 then determines if the top scoring action scores high enough to deliver to the user as shown in step 445. Conversation system 100 or more specifically CPU 140 then delivers the action to the user 180.

Figure 5:
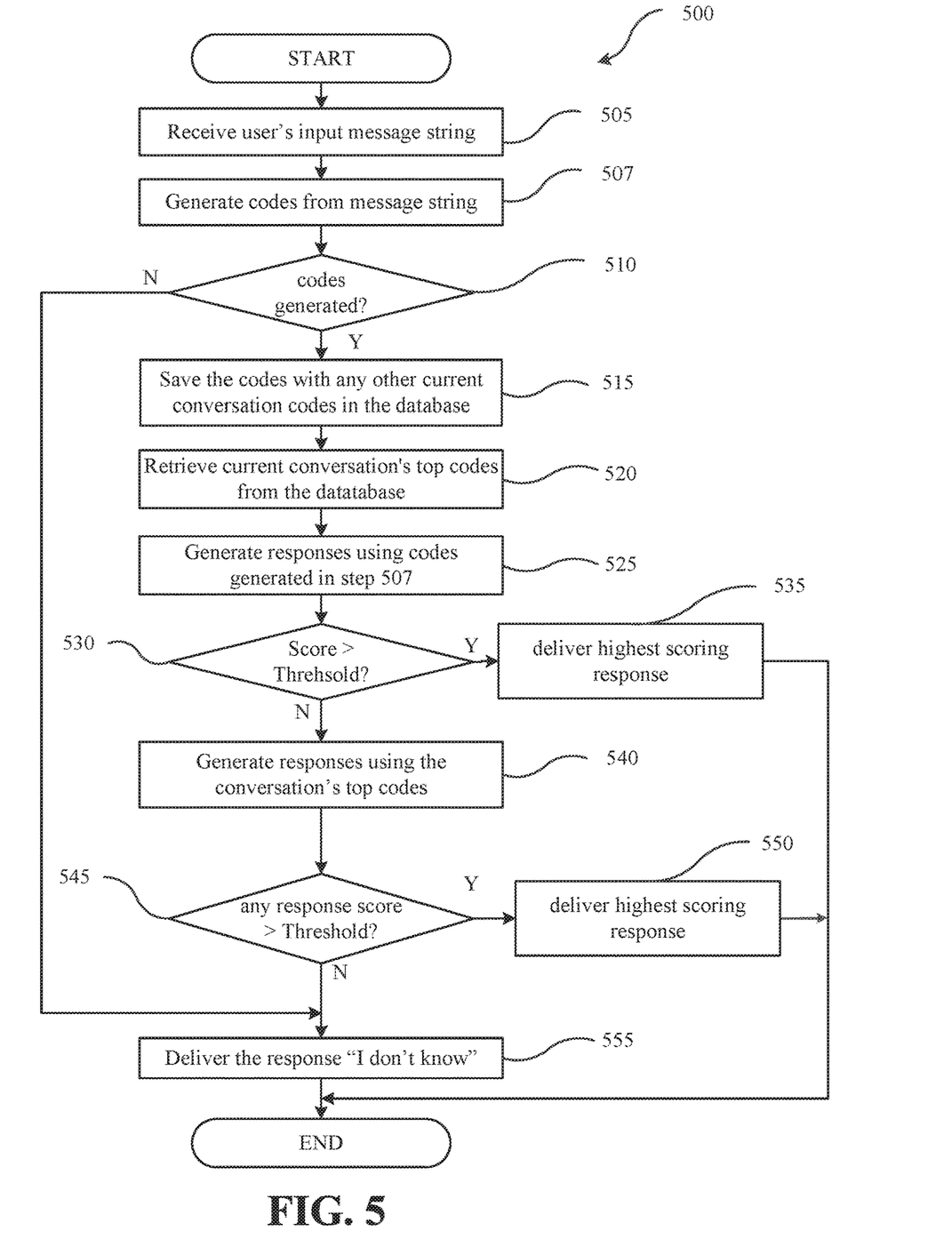
FIG. 5 is a high-level flowchart for a process for generating codes and delivering a highest scoring response, using the conversation system of FIG. 1.

FIG. 5 is a flowchart of process 500 for finding codes in a user's input message string, sending the codes in request for a set of responses, and returning a response that is most in accord with a user's input message string.

Upon receiving a user's input (505), CPU 140 sends the input in a structured query, searching for user input codes in the phraseCode type 305 of the Ri Index 304, as shown in step 507. The phraseCode type comprises code words matched with phrases. If CPU 140 determines that no codes were returned, as shown in step 510, it completes process 500 with an "I don't know" response (step 555).

As shown in step 515, if codes are found CPU 140 saves the top scoring codes in database 150 with the unique conversation key from process 400. After saving codes for the user input, CPU 140 then queries database 150 for the top codes for the conversation, as shown in step 520 (if this is a conversation's first response, conversation codes will be the same as the user input codes). As shown in step 525, CPU 140 then requests a list of responses using user input codes found in Ri Index 304, Determining that the top scoring response scores high enough (530), CPU 140 delivers the top scoring response (535). If the top scoring response did not score high enough, CPU 140 proceeds to request a list of responses to the top codes of the conversation, as shown in step 540. Then, as shown in step 545, CPU 140 detects which scores higher, responses generated in step 525 or responses generated in step 540, and delivers the highest scoring response (550). If no response scores higher than a base line minimum score saved in memory 135, CPU 140 delivers a response of "I don't know.", as shown in step 555.

FIG. 6 illustrates the process 600 for finding a response most in accordance with either the user's input codes or the top codes of the conversation. On receiving a user's input (605) CPU 140 sends codes generated in process 500 in a structured query searching for phrases in the phraseCode type 305 of the Ri Index 304, as shown in step 610. The phrases will be used in subsequent structured queries sent to Ri Index 304.

Detecting that the user asked a question (615), CPU 140 generates a question response, first sending a structured query to database 150 for emotional code phrases associated with the user. CPU 140 then combines those phrases with phrases found in step 610, and using the combination, sends a structured query searching for responses in the riResponse type 330 of the Ri Index 304, as shown in step 620. CPU 140 then processes phrases for only REF and SYM type codes and sends the phrases in a structured query searching for responses in the riMedium type 315 of the Ri Index 304. CPU 140 detects the highest scoring response from both these searches and delivers a response. Process 400 delivers the response to user device 100, as shown in step 435 in FIG. 4.

As shown in step 625, CPU 140 processes a thought response by sending phrases generated in step 610 in a structured query searching the issues field in the riThought type 335 of the Ri Index 304. Detecting that a search of the issues field delivered fix classes, CPU 140 sends phrases representing fixes for each fix class in a structured query searching for responses from the riAll type 310 of the Ri Index 304. CPU 140 then creates a response list, adds the top scoring search results to the list, and saves it in memory 135, as shown in step 630.

As shown in step 635, CPU 140 processes a helpful response by selecting the most prevalent code type of the "ACT", "SEM" or "HER" types, from the codes generated in process 500. Detecting that a top code type has been selected, CPU 140 sends a structured query to database 150, selecting phrases for the top code type. CPU 140 sends the phrases in a structured query requesting responses from the riAll type 310 of the Ri Index 304. CPU 140 adds the results from the search to a response list saved in memory 135, as shown in step 640.

As shown in step 645, CPU 140 determines if the user input is a short sentence. Short sentences may include simple statements like "I don't think so." or "Someone's at the door.", or aphorisms such as "Live and learn" or "Opposites attract". The short sentence response will return the user's input to the user with added words or sentence clauses. Determining that the user input is a short sentence, CPU 140 sends the user's input in an exact phrase structured query to the riAll type 310 of the Ri Index 304, as shown in step 650. This query searches for responses containing the exact phrase submitted in the query. Detecting search results containing the user's input with added text, CPU 140 adds the results to a response list saved in memory 135, as shown in step 655.

As shown in step 660, CPU 140 processes medium responses by sending phrases generated in step 610 in a structured query requesting responses from the riMedium type 315 of the Ri Index 304. CPU 140 adds the top scoring results from the search to response list saved in memory 135, as shown in step 665.

As shown in step 670, CPU 140 processes emotional responses by first sending the user's last conversation key in a structured query to database 150, retrieving a list of the latest emotion codes and phrases associated with the user. CPU 140 then sends the phrases in a structured query requesting responses from the riMedium type 315 of the Ri Index 304 and adds the results from the search to response list saved in memory 135, as shown in step 675.

As shown in step 680, CPU 140 sorts the response list from highest to lowest scoring response and delivers a list of top scoring responses.

As an example of utilizing process 500, the following is a scenario where a user is in conversation with a conversation system.

TABLE 2

| No | Party | Question/Response |
|---|---|---|
| 1 | user | I'm really enjoying dinner tonight. What a great meal! |
| 2 | system | It was with [great pleasure] that Mark found himself once more dressing for [dinner] and [what] seemed likely to be an excellent dinner. |
| 3 | user | The wine goes very well with the food. |
| 4 | system | [Gin] and tonic, [whisky] and Perrier or country wine? |
| 5 | user | I think the wine is from California, but I'm not sure. |
| 6 | system | George Henry was searching in [unlikely places] for the salt. |
| 7 | user | Unlikely? No. A lot of good wine comes from California. Actually, a lot of good wine comes from right here in BC. |

TABLE 2-continued

| No | Party | Question/Response |
|---|---|---|
| 8 | system | soul together, when there was [good food] and [wine] and [beer] in the army? |
| 9 | user | Ha. Yes, I do believe a good meal is good for the soul. |
| 10 | system | If you believe that, you'll believe anything. |
| 11 | user | Don't you believe good food and feeling satisfied and happy is good for the soul? |
| 12 | system | Their cosmogony links them with the Aztecs, the Mayas and Quiches of Central America |
| 13 | user | Surely we can find more popular philosophers who agree. |
| 14 | system | If all the world hated you, and believed you wicked, while your own conscience approved you. |
| 15 | user | I certainly enjoy a good meal without any pangs of conscience! |
| 16 | system | I think you'll find that's very good wine |

The user responds to the word "soul" in the system's response (statement No. 9), but may have responded to "beer" or "army" or reminisced about time spent in the army, taking the conversation in a different direction.

At statement No. 9, a conversation context has been established. Process 500 is used to generate a response and may respond not only to the last user input, but to the conversation context as well. Between question/response statement No. 13 and No. 14 in Table 2 above, conversation system 100 using CPU 140 performs the following steps:

(a) After receiving the user's input (505), CPU 140 generates the following codes from the input (507): scientist popular who find of course certainly canst agree approve assent;

(b) After saving codes from the user's input in the database 150 (515), CPU 140 retrieves the conversation's top codes from database 150. Conversation's top codes include: liquor wine good believe actually find scientist of course soul who food agree approve assume;

(c) CPU 140 generates responses (see Process 600) from the user's input codes (525). The top scoring response, "everyone seemed to know him or know about him.", scores 23.9833775;

(d) CPU 140 generates responses (using process 600) from the conversation's top codes (540). The top scoring response, "If all the world hated you, and believed you wicked, while your own conscience approved you,", scores 25.290432;

(e) CPU 140 determines that the top codes response (d) scores higher than the user's input codes response (c), and higher than the minimum score required, and so delivers the top codes response.

Between question/response statement No. 14 and No. 15 in Table 2, conversation system 100 using CPU 140 performs the following.

(a) After receiving the user's input (step 505) CPU 140 generates the following codes from the input (step 507): {certainly whatever any soul enjoy feast good 1 dining room};

(b) After saving codes from the user's input in the database 150 (step 515) CPU 140 retrieves the conversation's top codes from database 150. Conversation's top codes: {good liquor soul wine certainly dining room feast I believe actually enjoy find scientist of course}

(c) CPU 140 generates responses (using process 600) from the user's input codes (525). The top scoring response, "She cast the dice.", scores 24.0364628;

(d) CPU 140 generates responses (again using process 600) from the conversation's top codes (540). The top scoring response, "I think you'll find that's very good wine,", scores 24.9555588;

(e) CPU 140 determines that the top codes response (d) scores higher than the user's input codes response (c), and higher than the minimum score required, and delivers the top codes response to user device 102.

The following are examples of utilizing process 600. The first (Table 3) is an example of a conversation system generating a response to a question, and the second (Table 4) is an example of a conversation system generating a response that is not a response to a question.

TABLE 3

| | Question Response |
|---|---|
| user: | Do you enjoy watching sports? |
| system | Nurses were watching beautiful, well-behaved children. |

To come up with the above response in Table 3, CPU 140 generates a code list from the user's question in accordance with process 500: {watch enjoy monitor sports you}.

From the above code list CPU 140 generates a phrase list as shown in step 610: {sports I watch appreciate enjoy pleasure observe watcher monitor}.

CPU 140 also generates a phrase list from only REF and SYM codes {sports I observe watcher monitor}.

CPU 140 gets the latest emotional code associated with the user from database 150: {Behavior}.

CPU 140 selects at random one phrase associated with the emotion code from database 150: {behave}

CPU 140 combines the emotion phrase with three phrases from the phrase list (selected at random): {behave watch monitor watcher}.

Using the combination, CPU 140 sends a structured query searching for responses in the riResponse type 330 of the Ri Index 304, as shown in step 620, and the top scoring result is: "Nurses were watching beautiful, well-behaved children." with a score: 28.05688.

CPU 140 adds top scoring results to a response list.

CPU 140 selects at random four phrases from the phrase list generated from the SYM and REF codes: {I watcher observe sports}.

Using the above list, CPU 140 sends a structured query searching for responses in the riResponse type 330 of the Ri Index 304, as shown in step 620, and the top scoring result is: "Then the spokes: sports, sports, sports: and the hub big: college." with a score: 22.54822.

CPU 140 detects the highest scoring response from both these searches and delivers a response: "Nurses were watching beautiful, well-behaved children".

TABLE 4

| | Non-Question Response | |
|---|---|---|
| No | Party | Non-Question/Response |
| 1 | user | "It's a beautiful Sunday morning. The sun is out, the sky is blue and there isn't a cloud in the sky". |
| 2 | system | "That's Spanish for relax, take it easy". |

The user inputs "It's a beautiful Sunday morning. The sun is out, the sky is blue and there isn't a cloud in the sky".

CPU 140 generates a code list from the user's question in accordance with process 500. The generated code list is {sky sun morning there's burnt artistic attractive cloud blue out Sunday breakfast}.

From the above code list, CPU 140 generates a phrase list as shown in step 610: {blue Sunday breakfast brunch morning out sky cloud there's sun burnt attractive beautiful dawn sunlight sunshine aesthetic artistic creative}.

CPU 140 generates a thought response, as shown in step 625.

CPU 140 sends phrases generated in step 610 in a structured query to the issues field of the riThought type 335 of Ri Index 304, and the following fix classes are delivered: {"beauty", "wake", "weekend", "cloud"}.

For each fix class, a "fix" (as defined above) is sent in a structured query to the riAll type 310 and responses are generated. The top scoring response is: "That's Spanish for relax, take it easy." The score is: 30.0605011.

CPU 140 creates a response list, adds the above response to the list, and saves it to memory 135. CPU 140 generates a helpful response, as shown in step 635. CPU 140 sends a structured query to database 150, requesting the most prevalent code type of the "ACT", "SEM" or "HER" types, from the code list.

CPU 140 sends a structured query to database 150, requesting help phrases for the "SEM" code type. Database 150 delivers: "internal thoughts".

CPU 140 sends the help phrases in a structure query riAll type 310 of the Ri Index 304 and responses are generated. The top scoring response is: "An odd internal upsetting", The score is: 24.028347.

CPU 140 adds the above response to the list and saves it to memory 135. Detecting that the user input word count is greater than five words, CPU 140 does not generate a short sentence response. CPU 140 generates a medium response, as shown in step 660.

CPU 140 sends the phrase list in a structured query to the riMedium type 315 of the Ri Index 304 and responses are generated. The top scoring response is: "There were a blue sky and sunshine". The score is 29.144516.

CPU 140 adds the above response to the list and saves it to memory 135. CPU 140 generates an emotional response, as shown in step 670. CPU 140 sends a structured query to database 150 requesting two phrases for the emotion code associated with the user. The two phrases selected are: "behaviour drift".

CPU 140 sends the phrases in a structured query to the riMedium type 315 of the Ri Index 304 and responses are generated. The top scoring response is: "how different is his behaviour to that!". The score is 15.2763062.

CPU 140 adds the above response to the list and saves it to memory 135. CPU 140 sorts the response list in descending order by score and delivers the top scoring response as shown in step 680. The system then responds "That's Spanish for relax, take it easy".

FIG. 7 illustrates the process 700 for changing emotional state of a conversation system. As shown in step 705, CPU 140 sends a structured query to database 150 and gets a list of users who have had a conversation with the conversation system since the last time process 700 was executed. Cycling through the list of users, CPU 140 takes a user from the list (step 710) and completes the following process for each user: gets the phrases associated with the top codes for the user's conversations from database 150 (step 715); CPU 140 sends the phrases in a structured query to the riInternal type 320 of Ri Index 304, as shown in step 725; receives a list of responses, CPU 140 cycles through the responses (step 730); takes each response; finds any emotion codes in the response; adds the emotion code(s) to an emotion code list (step 735); counts the number of times each emotion code is added; when it has finished cycling through all the responses (step 740), CPU 140 determines the emotion code with the highest count, as shown in step 745; CPU 140 sends a structured query to database 150 saving a link between the user's last conversation and the emotion code with the highest count (step 750), thus associating that emotion code with the user for further reference; as shown in step 755, CPU 140 continues cycling through the user list generated in step 705; determining there are no more users in the list (step 755), CPU 140 stops processing (step 760).

The following example utilizes process 700. As shown, in step 705 CPU 140 retrieves a list of users who have had a conversation with the conversation system 100. The following user keys are found: 1068.

In step 715, CPU 140 retrieves from database 150 phrases associated with the top codes found in the user's conversations with the system: {what think go have how know having me myself not Self get be you're aye may might shall will yes}.

CPU 140 sends the phrases in a structured query to the riInternal type 320 of Ri Index 304, as shown in step 725, and finds the emotion code that appears most in the responses: "tounderstand".

The following Table 5 illustrates how the "tounderstand" emotion code and its types and phrases are saved in database 150:

TABLE 5

| Changing emotional state | | |
| --- | --- | --- |
| Code | Type | Phrase |
| tounderstand | LOV | think |
| tounderstand | LOV | contemplate |
| tounderstand | LOV | madness |
| tounderstand | LOV | understand |
| tounderstand | LOV | known |
| tounderstand | LOV | inexplicable |
| tounderstand | LOV | understood |
| tounderstand | NLOV | hidden |
| tounderstand | NLOV | blind |
| tounderstand | NLOV | ignorant |
| tounderstand | NLOV | ignore |
| tounderstand | NLOV | careless |
| tounderstand | NLOV | concealed |

CPU 140 saves a link between the "tounderstand" emotion code and the user's last conversation in database 150, thus linking the user 180 and the emotion code. Until CPU 140 saves another link between the user and an emotion code, the phrases associated with "tounderstand" will be used in all emotional responses. The only user key in the list is 1068, so CPU 140 stops processing as shown in step 760.

Although detailed exemplary embodiments have been discussed in relation to smartphones, those of skill in the art will readily understand that the invention is not confined to just smartphones but may be used to exchange messages using other devices, including voice enabled devices. Moreover, although detailed exemplary embodiments have been discussed in relation to on-demand information technology (IT) resources through a cloud service platform available via the internet, those of skill in the art will readily understand that the invention may be used on a stand-alone computing device such as a personal computer (PC).

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. A method for conducting an automated conversation, the method comprising:
    a) receiving, by a processing unit, a user input from a user device;
    b) generating one or more codes from the user input;
    c) generating one or more phrases from the one or more codes;
    d) generating a first set of first responses associated with each of the one or more phrases;
    e) assigning a score to each response of the first set of responses;
    f) selecting a top first response having the highest score among the first set of responses;
    g) adding the top first response having the highest score to a list of responses;
    h) determining the highest scoring response in the list of responses;
    i) sending the highest scoring response from the list of responses to the user device;
the method further comprising, prior to the step of determining the highest scoring response,
    j) generating a second set of responses that is different from the first set of responses;
    k) assigning a score to each response of the second set of responses;
    l) selecting a top second response having the highest score among the second set of responses; and
    m) adding the top second response to the list of responses.

2. The method of claim 1, further comprising:
    a) generating a generated "action" the form of a short sentence;
    b) assigning an action score for the generated "action";
    c) upon the action score exceeding a threshold action score, sending the generated "action" to the user device.

3. The method of claim 1, wherein the second set of responses is a set of one of: thought responses, question responses, helpful responses, short sentence responses, medium responses, and emotional responses.

4. The method of claim 3, wherein the second set of responses is a set of question responses, the method further comprising:
    a) checking for user input indicating a question prior to generating the second set of responses; and
    b) upon identifying the user input indicating a question, selecting phrases associated with Symbolic ("SYM") and Referential ("REF"), during said generating said phrases.

5. The method of claim 3, wherein the second set of responses is a set of helpful responses, the method further comprising:
    a) checking for user input indicating a helpful response prior to said generating the second set of responses; and
    b) upon identifying the user input indicating a helpful response, selecting phrases associated with one of Action ("ACT"), Hermeneutic ("HER") and Semantic ("SEM"), during said generating said phrases.

6. The method of claim 3, wherein the second set of responses is a set of short sentence responses, the method further comprising: checking whether the user input is a short sentence prior to said generating the second set of responses.

7. A method for conducting an automated conversation, the method comprising:
    a) receiving, by a processing unit, a user input from a user device;
    b) generating one or more codes from the user input;
    c) saving the one or more codes associated with the automated conversation in a database;
    d) generating a first set of responses associated with each of the one or more codes;
    e) assigning a score to each response of the first set of responses associated with e one or more codes;
    f) selecting a first top response having a top score among the responses of the first set of responses; and
    g) upon the top score exceeding the threshold score, sending the first top response having the top score to the user device,
the method further comprising, prior to the step of generating the first set of responses: retrieving all codes associated with the automated conversation saved in the database; scoring the retrieved codes; and
upon the top score not exceeding the threshold score:
    i) generating a second set of responses associated with each of the retrieved codes;
    ii) assigning a score to each response of the second set of responses;
    iii) selecting a second top response having the highest score among the responses of the second set of responses; and
    iv) sending the second top response having the highest score to the user device.

8. The method of claim 7, further comprising:
    a) generating an action;
    b) assigning an action score for the action;
    c) upon the action score exceeding a threshold action score, sending the action to the user device.

9. The method of claim 7, wherein said generating the first set of responses further comprises: determining if the user input is a start of a new conversation; and saving the new conversation to one of a memory and a database.

10. A conversation system for conducting an automated conversation with a user device, the system comprising:
    a data center comprising: a processing unit interconnected to a memory, a storage, and a network interface for communicating with a user device, the processing unit coupled to the memory, the storage storing processor executable instructions;
    the data center implementing an elastic search service, a plurality of indices, and a database, the processing unit executing instructions to perform the steps of:
    a) receiving a user input from the user device that has been routed through a server;
    b) generating one or more codes from the user input;
    c) generating one or more phrases from the one or more codes;
    d) generating a first set of responses associated with each of the one or more phrases;
    e) assigning a score to each response of the first set of responses;

f) selecting a top first response having the highest score among the responses of the first set of responses;
g) adding the op first response to a list of responses;
h) determining the highest scoring response in the list of responses;
i) sending the highest scoring response from the list of responses to the user device;

wherein the processing unit further executes the instructions to perform the steps of:
j) generating an "action", in the form of a short sentence;
k) assigning an action score for the "action"; and
l) upon the action score exceeding a threshold action score, sending the "action" to the user device.

11. The conversation system of claim 10, wherein the processing unit executes instructions to perform, prior to said determining the highest scoring response in the list of responses, the steps of:
a) generating a second set of responses different from the first set of responses;
b) assigning a score to each response of the second set of responses;
c) selecting a second response having a top score among the responses of the second set of responses; and
d) adding the second response having the top score to the list of responses.

12. The conversation system of claim 11, wherein the second set of responses is a set of question responses, wherein the processing unit executes instructions to perform the step of: checking whether the user input is a question prior to generating the second set of responses.

13. The conversation system of claim 11, wherein the second set of responses is a set of short sentence responses, wherein the processing unit executes the instructions to perform the steps of: checking whether the user input is a short sentence prior to generating the second set of responses.

14. The conversation system of claim 10, wherein the responses of the second set of responses are one of: thought responses, question responses, helpful responses, short sentence responses, medium responses, and emotional responses.

15. The conversation system of claim 10, wherein said generating said response further comprises: determining that the user input is a start of a new conversation and saving the new conversation to the database.

* * * * *